United States Patent Office 2,977,286
Patented Mar. 28, 1961

2,977,286

**SYNTHESIS OF STEROIDS WITH *KABATIELLA PHORADENDRI***

Allen I. Laskin, Franklin Township, Mariano A. Guiducci, Edison, and Josef Fried, Princeton, N.J., assignors to Olin Mathieson Chemical Corporation, New York, N.Y., a corporation of Virginia No Drawing. Filed May 22, 1959, Ser. No. 814,986

5 Claims. (Cl. 195—51)

This invention relates to, and has for its object the provision of, a method of producing 21-hydroxy steroids of the pregnane series. These steroids are known compounds which are either physiologically active or are useful in the preparation of physiologically active steroids by methods known in the art.

It has been found that steroids of the pregnane series (especially of the 3,20-diketo-$\Delta^4$-pregnene series), unsubstituted in the 21-position, can be converted to their corresponding 21-hydroxy derivatives by subjecting the former to the action of enzymes of the known species of microorganism, *Kabatiella phoradendri*. The action of the enzymes can be utilized either by bringing together, in an aqueous nutrient medium, the steroid, oxygen and enzymes or non-proliferating cells of the microorganism or (preferably) by including the steroid in an aerated culture of the microorganism.

In general, the conditions of culturing the microorganism for the purpose of this invention are (except for the inclusion of the steroid to be 21-hydroxylated) the same as those of culturing microorganisms for the production of antibiotics or vitamins; thus, the microorganism is grown in contact with (in or on) a suitable nutrient medium in the presence of oxygen (air). A suitable nutrient medium essentially comprises a source of nitrogenous factors and an assimilable source of carbon and energy. The latter may be a carbohydrate (such as sucrose, molasses, glucose, maltose, starch, or dextrin) and/or the steroid itself. Preferably, however, the medium includes an assimilable source of carbon and energy in addition to the steroid.

The source of nitrogenous factors may be organic (e. g. soybean meal, corn steep liquor, meat extract, distillers solubles, peptones and/or yeast extract) or synthetic (i. e. composed of simply, synthesizable organic and inorganic compounds such as ammonium salts, alkali nitrates, amino acids or urea).

Among the 21-unsubstituted steroids of the pregnane series which may be converted into useful 21-hydroxy derivatives by the practice of this invention may be mentioned progesterone; $\Delta^{16}$-dehydroprogesterone; pregnenolone; pregnane-3,20-dione; monohydroxyprogesterones [e. g., 11$\alpha$-hydroxyprogesterone, the 9$\alpha$- and 12$\alpha$-halo-11$\beta$-hydroxyprogesterones, 17$\alpha$-hydroxyprogesterone, and the 9$\alpha$- and 12$\alpha$-lower alkyl (e. g. methyl)-11$\beta$-hydroxyprogesterones]; the dihydroxyprogesterones [e.g. 11$\beta$, 17$\alpha$ - dihydroxyprogesterone, $\Delta^{1,4}$ - pregnadiene - 11$\beta$,17$\alpha$-diol-3,20-dione, the 9$\alpha$- and 12$\alpha$-halo-11$\beta$,17$\alpha$-dihydroxyprogesterones, the 9$\alpha$- and 12$\alpha$-halo-$\Delta^{1,4}$-pregnadiene-11$\beta$, 17$\alpha$-diol-3,20-diones, and the 9$\alpha$- and 12$\alpha$-lower alkyl (e. g. methyl)-11$\beta$,17$\alpha$-dihydroxyprogesterones]; the trihydroxyprogesterones [e. g. 11$\beta$,16$\alpha$,17$\alpha$-trihydroxyprogesterone, $\Delta^{1,4}$-pregnadiene-11$\beta$,16$\alpha$,17$\alpha$-triol-3, 20-dione, the 9$\alpha$- and 12$\alpha$-halo-11$\beta$,16$\alpha$,17$\alpha$-trihydroxyprogesterones, the 9$\alpha$- and 12$\alpha$-halo-$\Delta^{1,4}$-pregnadiene-11$\beta$-16$\alpha$,17$\alpha$-triol-3, 20-diones, and the 9$\alpha$- and 12$\alpha$-lower alkyl (e.g. methyl)-11$\beta$,16$\alpha$,17$\alpha$-trihydroxyprogesterones]; and the 11-keto analogues of those steroids containing an 11$\beta$-hydroxy group.

The following examples are illustrative of the invention (all temperatures being in centrigrade):

EXAMPLE 1

*12$\alpha$-methyl-11-dehydrocorticosterone*

(a) Fermentation: Surface growth of a two week old agar slant culture of *Kabatiella phoradendri* (American Type Culture Collection No. 11,129), the slant containing as a nutrient medium (A):

| | G. |
|---|---|
| Glucose | 10 |
| Yeast extract | 2.5 |
| K$_2$HPO$_4$ | 1 |
| Agar | 20 |

Distilled water to 1 liter.

is suspended in 2.5 ml. of a 0.01% Dupanol aqeous solution. One ml. portions of the suspension are used to inoculate ten 250 ml. conical flasks, each containing 50 ml. of the following sterilized medium (B):

| | G. |
|---|---|
| Dextrose | 10 |
| Corn steep liquor | 6 |
| NH$_4$H$_2$PO$_4$ | 3 |
| Yeast extract | 2.5 |
| CaCO$_3$ | 2.5 |
| Soybean oil | 2.2 |

Distilled water to 1 liter.

After 72 hours incubation at 25° with continuous rotary agitation (280 cycles per minutes; 2 inch radius), 10% (vol./vol.) transfers are made to sixty-seven 250 ml. conical flasks each containing 50 ml. of fresh sterilized medium B plus 300 micrograms/ml. of 12$\alpha$-methyl-11-ketoprogesterone. (The steroid is added by supplementing each flask with 0.25 ml. of a sterile solution of the steroid in N,N-dimethylformamide containing 60 mg./ml. of steroid.) After 92 hours of further incubation, the contents of the flasks are pooled and filtered through a Seitz clarifying pad. The flasks, mycelium and pads are washed with successive 50 ml. portions of warm water. The combined filtrate and washings have a volume of 3350 ml.

(b) Isolation of 12$\alpha$-methyl-11-dehydrocorticosterone: The combined filtrate and washings are extracted with two 500 ml. and two 400 ml. portions of chloroform. The combined chloroform extracts are then washed successively with 1% hydrochloric acid, water, sodium bicarbonate solution and again with water, dried over sodium sulfate, filtered and evaporated to dryness in vacuo. The resulting crude product weighs about 740 mg. Crystallization from 95% ethanol yields about 513 mg. of material (49% yield) M.P. about 140–149°. The analytical sample has the following properties: M.P. about 149–151°; $[\alpha]_D^{23}$+207.5° (CHCl$_3$);

$\lambda_{max.}^{alc.}$ 237 m$\mu$ (15,500); $\lambda_{max.}^{Nujol}$ 2.78, 2.92, 5.86 (inflection), 5.90, 6.05 and 6.19$\mu$

*Analysis.*—Calc'd for C$_{22}$H$_{30}$O$_4$ (358): C, 73.71; H, 8.44. Found: C, 73.54; H, 8.47.

EXAMPLE 2

*11-desoxycorticosterone*

Following the procedure of Example 1, but substituting an equivalent amount of progesterone for the 12$\alpha$-methyl-11-ketoprogesterone, in step *a*, 11-desoxycorticosterone is obtained.

EXAMPLE 3

$\Delta^{4,16}$-pregnadiene-21-ol-3,20-dione

Following the procedure of Example 1, but substituting an equivalent amount of 16-dehydroprogesterone for the 12α-methyl-11-ketoprogesterone in step a, $\Delta^{4,16}$-pregnadiene-21-ol-3,20-dione is obtained.

The invention may be variously otherwise embodied within the scope of the appended claims.

What is claimed is:

1. A process for preparing a 21-hydroxylated steroid of the pregnane series, which comprises subjecting a steroid of the pregnane series, unsubstituted in the 21-position, to the action of enzymes of the microorganism *Kabatiella phoradendri* in the presence of oxygen and recovering the resulting 21-hydroxy steroid.

2. The process of claim 1 wherein the steroid reactant is of the 3,20-diketo-$\Delta^4$-pregnene series.

3. The process of claim 1 wherein the steroid reactant is progesterone.

4. The process of claim 1 wherein the steroid reactant is $\Delta^{16}$-dehydroprogesterone.

5. The process of claim 1 wherein the steroid reactant is 12α-methyl-11-ketoprogesterone.

References Cited in the file of this patent

UNITED STATES PATENTS

| | | |
|---|---|---|
| 2,805,978 | Hagemann et al. | Sept. 10, 1957 |
| 2,819,200 | Dulaney et al. | Jan. 7, 1958 |